W. BARTHOLOMEW.
BEARING FOR VERTICAL DRIVE SHAFTS.
APPLICATION FILED MAY 25, 1911.

1,028,318.

Patented June 4, 1912.

WITNESSES

INVENTOR
William Bartholomew

UNITED STATES PATENT OFFICE.

WILLIAM BARTHOLOMEW, OF CHICAGO, ILLINOIS, ASSIGNOR TO TROY LAUNDRY MACHINERY COMPANY, LIMITED, OF CHICAGO, ILLINOIS, A CORPORATION OF NEW YORK.

BEARING FOR VERTICAL DRIVE-SHAFTS.

1,028,318.  Specification of Letters Patent.  Patented June 4, 1912.

Application filed May 25, 1911. Serial No. 629,463.

*To all whom it may concern:*

Be it known that I, WILLIAM BARTHOLOMEW, a citizen of the United States, residing at Chicago, county of Cook, State of Illinois, have invented certain new and useful Improvements in Bearings for Vertical Drive-Shafts, of which the following is a specification, reference being had therein to the accompanying drawing.

This invention relates to ball bearings for vertical drive shafts especially constructed for driving either the fan or the endless conveyer used in dry rooms but it is, of course, understood that the same may be used for any purpose desired where a vertical drive shaft is used and in order to enable one to understand the operation of the same, reference is made to the companion case filed of even date herewith Serial No. 629,464.

Another object of the invention is to provide a bearing in which the oil cup is so arranged that all danger of the oil being thrown outwardly, when the driving member is being rotated, is prevented, thereby overcoming difficulties now existing in bearings of this character used in connection with dry rooms.

A further object of the invention is to provide a novel form of bearing whereby the same may be readily installed in a dry room in such a manner that the driving shaft mounted therein will be supported.

Other and further objects and advantages of the invention will be hereinafter set forth and the novel features thereof defined by the appended claim.

Figure 1:
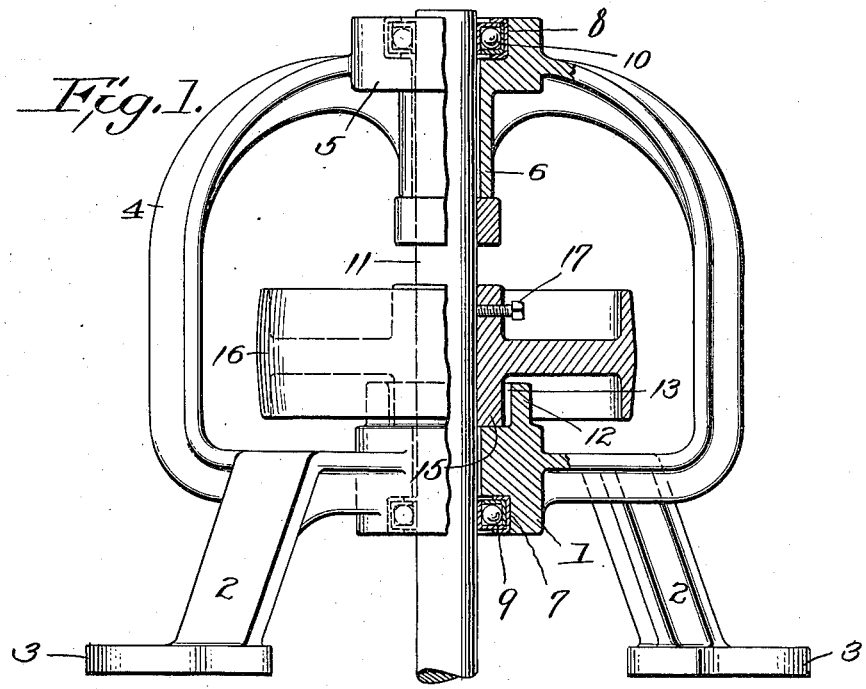
Figure 2:
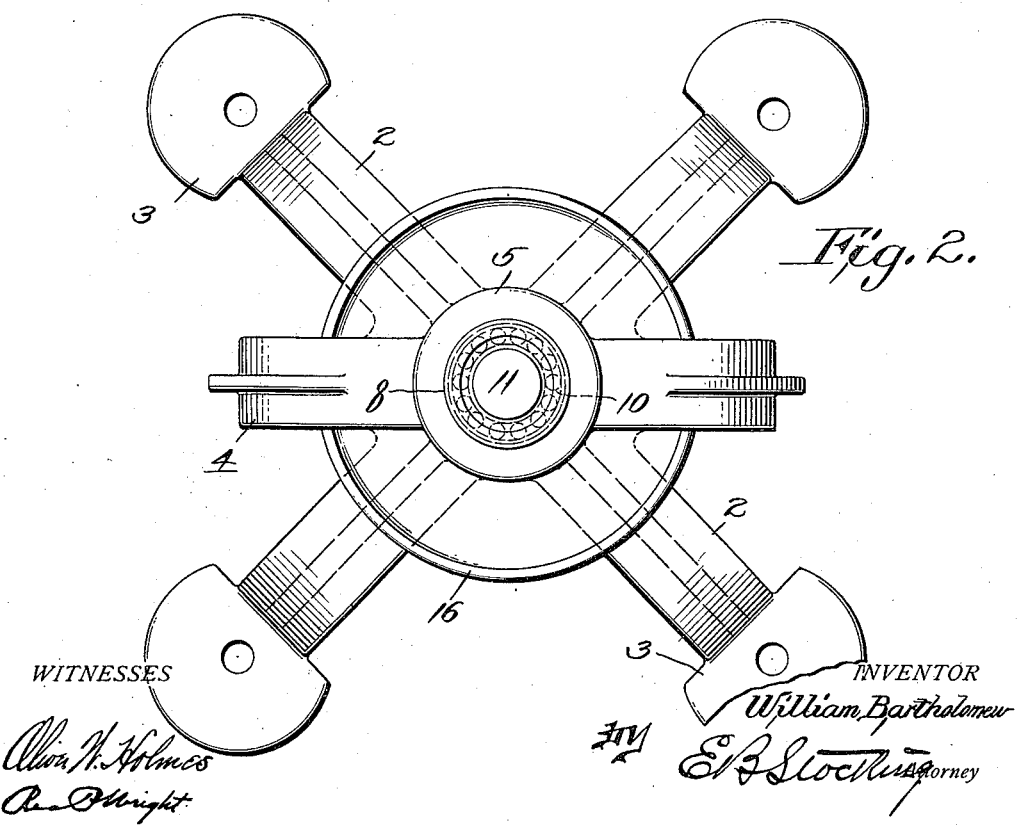

In the drawing—Figure 1 is a side elevation, partly in section, of my improved ball bearing for vertical drive shafts showing a pulley arranged on the drive shaft, the lower end of the shaft being broken away; and Fig. 2 is a top plan view.

Like numerals of reference refer to like parts in the several figures of the drawing.

In the drawing, 1 indicates a circular base having outwardly and downwardly projecting leg portions 2 provided with apertured feet 3 for securing the same in position in such a manner that it will be firmly held when the driving shaft, which will be later described, is being driven. Formed integral with the base 1, is a yoke 4 which is provided with a central enlarged bearing portion 5 having a depending bearing portion 6. The base 1 forms a bearing and is provided with a central opening in vertical alinement with the bearings 5 and 6 and the base 1 and bearing 5 are provided with annular chambers 7 and 8 in which are mounted ball races 9 carrying balls 10, said races being carried, respectively, by the bearings and a vertical shaft 11 which is mounted therein as clearly shown.

The base or bearing 1 is provided with an upwardly projecting annular flange 12 forming an oil chamber or cup 13 in which extends the hub portion 15 of a drive pulley 16 which is fixed to the shaft 11 by a set-screw 17, said hub resting and revolving upon the bottom of the chamber 13 which is adapted to contain oil. It will be noticed that the bearings 1, 5 and 6 have a greater diameter than the diameter of the shaft 11 in order to allow the balls to perform their function which center the shaft in such a manner that the same will rotate freely. Any suitable member to be driven can be fixed on the depending portion of the shaft 11 and the lower end of the shaft is adapted to carry a cup as shown in my companion application filed May 25, 1911, Serial No. 629,464.

Having described my invention and set forth its merits, what I claim and desire to secure by Letters Patent is—

A bearing for vertical drive shafts comprising a circular base having a vertical bearing and provided with oppositely disposed supporting legs, said base being provided with a bearing chamber in its under side and an oil chamber in its top formed by an annular flange, an integral yoke extending upwardly from said base and provided with a depending bearing in vertical alinement with the bearing of the base, said bearing being provided with a bearing chamber in its top, a vertical shaft extending through said bearings and bearing chambers, and a drive member fixed on said shaft between said bearing chambers having a hub working in the oil chamber on the top of the base.

In testimony whereof I affix my signature in presence of two witnesses.

WILLIAM BARTHOLOMEW.

Witnesses:
J. HOERMANN,
WM. KROGMAN.

Copies of this patent may be obtained for five cents each, by addressing the "Commissioner of Patents, Washington, D. C."